United States Patent
Song et al.

(10) Patent No.: US 9,904,144 B1
(45) Date of Patent: Feb. 27, 2018

(54) ULTRAFAST OPTICAL SWITCHING DEVICE BASED ON BLACK PHOSPHORUS

(71) Applicant: Korea Institute of Science and Technology, Seoul (KR)

(72) Inventors: Yong-Won Song, Seoul (KR); Md. Siam Uddin, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/487,583

(22) Filed: Apr. 14, 2017

(30) Foreign Application Priority Data

Nov. 30, 2016 (KR) .................. 10-2016-0162040

(51) Int. Cl.
  *G02F 1/295* (2006.01)
  *G02F 1/35* (2006.01)
  *G02F 1/365* (2006.01)
  *G02F 1/355* (2006.01)

(52) U.S. Cl.
  CPC ............ *G02F 1/3521* (2013.01); *G02F 1/355* (2013.01); *G02F 1/3536* (2013.01); *G02F 1/365* (2013.01); *G02F 2203/055* (2013.01); *G02F 2203/07* (2013.01)

(58) Field of Classification Search
  CPC ............................ G02F 1/3521; G02F 1/3536
  See application file for complete search history.

(56) References Cited

U.S. PATENT DOCUMENTS

| | | |
|---|---|---|
| 6,603,902 B1 | 8/2003 | So |
| 8,139,617 B2 | 3/2012 | Song |
| 9,075,009 B2 | 7/2015 | Kim et al. |

(Continued)

FOREIGN PATENT DOCUMENTS

| | | |
|---|---|---|
| JP | 2005-77470 A | 3/2005 |
| KR | 10-1028803 B1 | 4/2011 |
| KR | 10-2011-0128123 A | 11/2011 |

OTHER PUBLICATIONS

Chow, K.K. et al., "Four-Wave mixing in a single-walled carbon-nanotube-deposited D-Shape fiber and its application in tunable wavelength conversion," Optics Express, vol. 17 No. 18, Aug. 19, 2009 (pp. 15608-15613).

(Continued)

*Primary Examiner* — Sung Pak
(74) *Attorney, Agent, or Firm* — NSIP Law (57) ABSTRACT

Disclosed is an ultrafast optical switching device based on black phosphorus, including a first channel to generate a first laser which is a continuous wave of a first wavelength, a second channel to generate a second laser which is a continuous wave of a second wavelength different from the first wavelength, a modulator to modulate the second laser generated by the second channel into a pump signal, a first and a second wavelength tunable filters to change wavelengths of the first laser and the second laser, respectively, a directional coupler to couple the first laser and the second laser, and an optical element to control the first and second lasers coupled by the directional coupler by means of nonlinearity and an evanescent field of black phosphorus. Accordingly, volume and size of an ultrafast optical switching device may be reduced, and a data processing rate may be improved.

12 Claims, 9 Drawing Sheets

(56) References Cited

U.S. PATENT DOCUMENTS

2005/0207757 A1* 9/2005 Okuno .................... G02F 2/004
                                                                 398/85
2017/0199443 A1* 7/2017 Vermeulen ............ G02F 1/3544
2017/0309769 A1* 10/2017 Engel .................... H01L 31/109

OTHER PUBLICATIONS

Xu, B. et al., "Mechanically Exfoliated Graphene for Four-Wave-mixing-based wavelength conversion," IEEE Photonics Technology Letters, vol. 24 No. 20, Oct. 15, 2012, (pp. 1792-1794).
Wu, Y. et al., "Generation of cascaded four-wave-mixing with graphene-coated microfiber," Photonics Research, vol. 3, No. 2, Apr. 2015, (pp. A64-A68).

* cited by examiner

ULTRAFAST OPTICAL SWITCHING DEVICE BASED ON BLACK PHOSPHORUS

CROSS-REFERENCE TO RELATED APPLICATION

This application claims priority to Korean Patent Application No. 10-2016-0162040, filed on Nov. 30, 2016, and all the benefits accruing therefrom under 35 U.S.C. § 119, the contents of which in its entirety are herein incorporated by reference.

BACKGROUND

1. Field

The present disclosure relates to an ultrafast optical switching device based on black phosphorus, and more particularly, to an optical switching device based on four-wave mixing (FWM) using nonlinear characteristics of black phosphorus.

[Description about National Research and Development Support]

This study was supported by the research for black phosphorus-based ultrafast photonic devices of Ministry of Science, ICT and Future Planning, Republic of Korea (Project No. 1711037588) under the superintendence of Korea Institute of Science and Technology.

2. Description of the Related Art

From the discovery of graphene in 2004, various 2D nano materials and their applications have been found and studied. Graphene has various advantages such as robustness as a physical element and high charge mobility as an electronic element as well as various optical characteristics such as high transmittance and broad transmission spectrum, and thus applications using graphene as an optical element material are being actively studied.

However, due to drawbacks such as a small bandgap and a low on-off ratio, the utilization of graphene as a semiconductor is restricted, and thus the status of graphene as a next-generation semiconductor has been fallen greatly.

Also, other 2D nano materials such as chalcogenide have been studied as probable next-generation semiconductor materials, but any of them does not show excellent or equivalent electric characteristics in comparison to graphene, except for the bandgap.

Meanwhile, black phosphorus is one of allotropes of phosphorus and has a layered structure which may have a thickness in an atom level, similar to graphene. Black phosphorus is a next-generation semiconductor material and is reported as being capable of overcoming both metallic properties of graphene and low charge mobility of chalcogenide, which hinder the characteristics of a semiconductor element.

However, black phosphorus is not stable since it has too high response speed in the air. Thus, there are many difficulties in manufacturing or operating a semiconductor element with black phosphorus, and relevant studies have been not satisfactory from its discovery.

SUMMARY

The present disclosure is directed to providing an ultrafast optical switching device based on black phosphorus.

In one aspect, there is provided an ultrafast optical switching device based on black phosphorus, comprising: a first channel configured to generate a first laser which is a continuous wave of a first wavelength; a second channel configured to generate a second laser which is a continuous wave of a second wavelength different from the first wavelength; a modulator configured to modulate the second laser generated by the second channel into a pump signal; a first wavelength tunable filter and a second wavelength tunable filter configured to change wavelengths of the first laser and the second laser, respectively; a directional coupler configured to couple the first laser and the second laser; and an optical element configured to control the first and second lasers coupled by the directional coupler by means of nonlinearity and an evanescent field of black phosphorus.

In an embodiment of the present disclosure, the ultrafast optical switching device based on black phosphorus may further comprise a first amplifier and a second amplifier configured to amplify wavelengths of the first laser and the second laser, respectively.

In an embodiment of the present disclosure, the ultrafast optical switching device based on black phosphorus may further comprise a first polarization controller (PC) and a second polarization controller configured to adjust polarizations of the first laser and the second laser, respectively.

In an embodiment of the present disclosure, the optical element may include: a core formed at a center of an optical fiber in a length direction thereof and allowing a laser to pass therethrough; a cladding configured to surround the core, the cladding being partially removed so that the core is exposed in the length direction; and a black phosphorus layer located on the core where the cladding is removed, the black phosphorus layer interacting with the laser to guide saturable absorption of the laser in the core.

In an embodiment of the present disclosure, the ultrafast optical switching device based on black phosphorus may further comprise a protective layer formed on the black phosphorus layer to prevent oxidation of the black phosphorus layer.

In an embodiment of the present disclosure, the black phosphorus layer may be formed with a single layer or multi layers.

In another aspect of the present disclosure, there is provided an ultrafast optical switching device based on black phosphorus, comprising: a first channel configured to generate a first laser which is a continuous wave of a first wavelength; a second channel configured to generate a second laser which is a continuous wave of a second wavelength different from the first wavelength; a modulator configured to modulate the second laser generated by the second channel into a pump signal; a directional coupler configured to couple the first laser and the second laser; a wavelength tunable filter configured to change a wavelength of the first and second lasers coupled to each other, respectively; and an optical element configured to control the first and second lasers coupled by the directional coupler by means of nonlinearity and an evanescent field of black phosphorus.

In an embodiment of the present disclosure, the ultrafast optical switching device based on black phosphorus may further comprise an amplifier configured to amplify a wavelength of the first laser and the second laser coupled to each other, respectively.

In an embodiment of the present disclosure, the ultrafast optical switching device based on black phosphorus may further comprise a first polarization controller (PC) and a second polarization controller configured to adjust polarizations of the first laser and the second laser, respectively.

In an embodiment of the present disclosure, the optical element may include: a core formed at a center of an optical fiber in a length direction thereof and allowing a laser to pass therethrough; a cladding configured to surround the core, the cladding being partially removed so that the core is exposed in the length direction; and a black phosphorus layer located on the core where the cladding is removed, the black phosphorus layer interacting with the laser to guide saturable absorption of the laser in the core.

In an embodiment of the present disclosure, the ultrafast optical switching device based on black phosphorus may further comprise a protective layer formed on the black phosphorus layer to prevent oxidation of the black phosphorus layer.

In an embodiment of the present disclosure, the black phosphorus layer may be formed with a single layer or multi layers.

If the ultrafast optical switching device based on black phosphorus is used, it is possible to implement an ultrafast optical switching device which applies a spectrum to a broad range by means of four-wave mixing (FWM) using two laser inputs. In addition, if the ultrafast optical switching device based on black phosphorus is applied to various communication devices or the like, it is possible to improve data processing rate and quality while allowing a subminiature and ultra-slim design.

DETAILED DESCRIPTION

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other. For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained. In the drawings, like reference numerals denote like elements through several drawings.

Hereinafter, embodiments of the present disclosure will be described in more detail with reference to the accompanying drawings.

Figure 1:
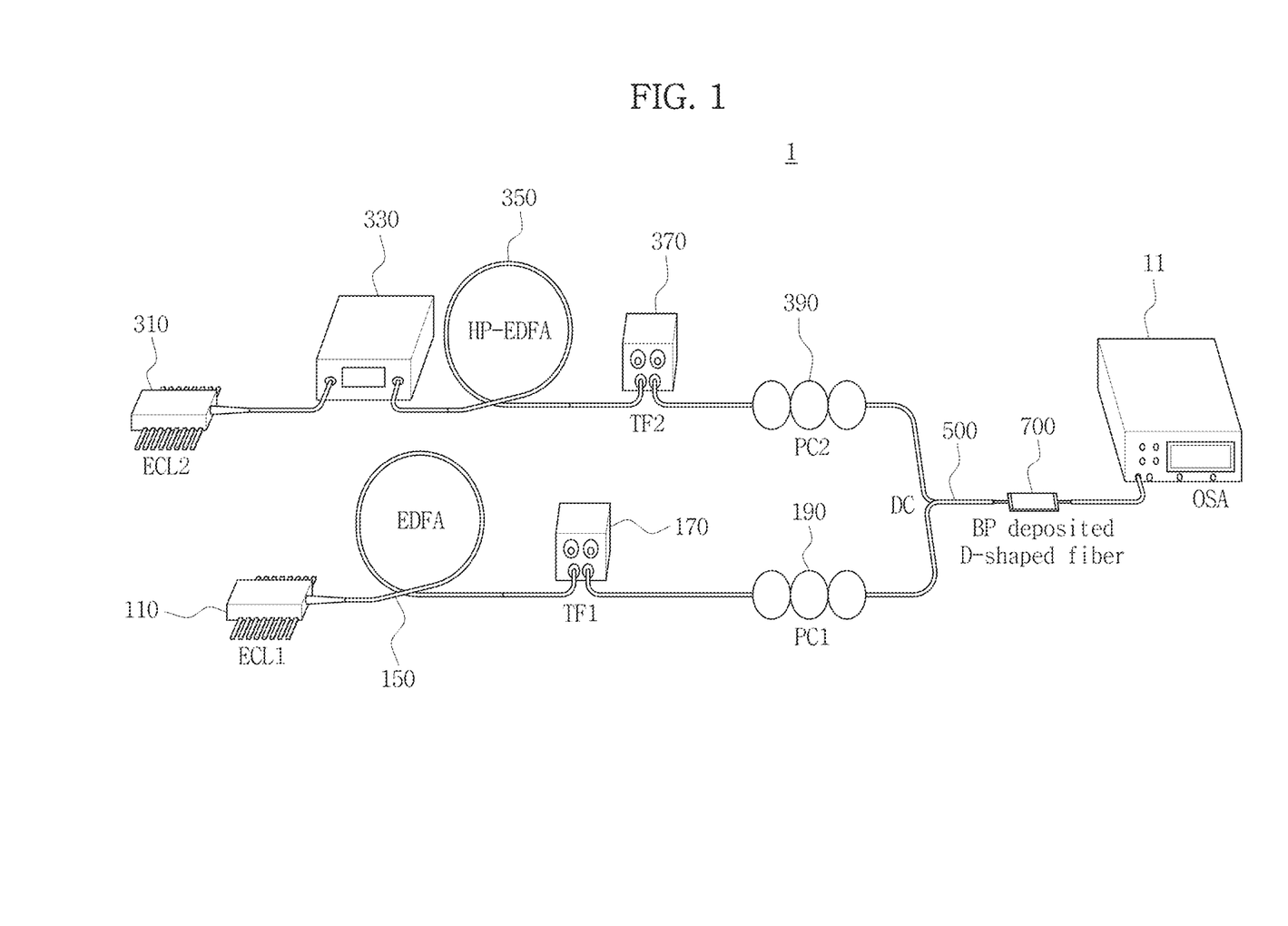
FIG. 1 is a diagram showing an ultrafast optical switching device based on black phosphorus according to an embodiment of the present disclosure.

FIG. 1 is a diagram showing an ultrafast optical switching device based on black phosphorus according to an embodiment of the present disclosure.

An ultrafast optical switching device 1 (hereinafter, referred to as an optical switching device) based on black phosphorus according to this embodiment performs four-wave mixing (FWM) with two laser inputs.

The FWM is a phenomenon caused by an optical Kerr effect and is generated when two or more high-power optical signals of different wavelengths are propagated through an optical medium. Recently, in the quantum and photon studies, the FWM is used for wavelength transformation, optical parametric amplification, super-continuum generation, frequency comb generation and various signal manipulations.

In the present disclosure, black phosphorus is used as a nonlinear optical element for the FWM, and due to an evanescent field interaction of the black phosphorus, the black phosphorus may be applied to broad optical spectra.

Referring to FIG. 1, the optical switching device 1 of this embodiment includes a first channel 110, a second channel 310, a modulator 330, a first wavelength tunable filter 170, a second wavelength tunable filter 370, a directional coupler 500, and an optical element 700 based on black phosphorus.

The components of the optical switching device 1 are connected by means of optical fibers. The structure of the optical switching device 1 as depicted in FIG. 1 is just an example, and components may also be excluded, added or changed as necessary.

The first channel 110 and the second channel 310 generate continuous wave lasers of different wavelengths. In other words, the first channel 110 outputs a first laser which is a continuous wave of a first wavelength, and the second channel 310 outputs a second laser which is a continuous wave of a second wavelength different from the first wavelength.

The modulator 330 modulates the second laser output from the second channel 310. In an embodiment, the modulator 330 periodically turns on/off the second laser which is a continuous wave, to be modulated into a pump signal.

The optical switching device 1 may further include a first amplifier 150 for amplifying a wavelength of the first laser output from the first channel 110 and a second amplifier 350 for amplifying a wavelength of the second laser output from the second channel 310 or the modulator 330.

The first wavelength tunable filter 170 is a frequency filter for changing a wavelength of the first laser. In addition, the second wavelength tunable filter 370 is a frequency filter for changing a wavelength of the modulated second laser. Since the wavelength may be tuned using the first wavelength tunable filter 170 and the second wavelength tunable filter 370, it is possible to control the frequency into a desired frequency band.

The optical switching device 1 may further include a first polarization controller 190 and a second polarization controller 390 for adjusting polarizations of the first laser and the second laser, respectively.

The directional coupler 500 couples and outputs the first laser and the second laser.

The optical element 700 controls the first laser and the second laser coupled and output by the directional coupler 500 by means of nonlinearity and an evanescent field of black phosphorus.

The FWM is performed by means of nonlinear responses of a material to which optical signals are transmitted. If two optical signals of carrier frequencies $\omega_s$ and $\omega_p$ are propagated into a nonlinear medium simultaneously, a new channel with frequencies $\omega_{g1}$ and $\omega_{g2}$ of the $\chi$ medium is generated. In view of quantum, this is a light scattering process in which photons are scattered from two or more waveforms by means of three-order nonlinearity and now photons are generated from other frequencies.

Black phosphorus has high optical nonlinearity, and a specific portion of the signal improves interactions of the nonlinear effect out of the optical fiber by means of the evanescent field interaction.

Figure 2:
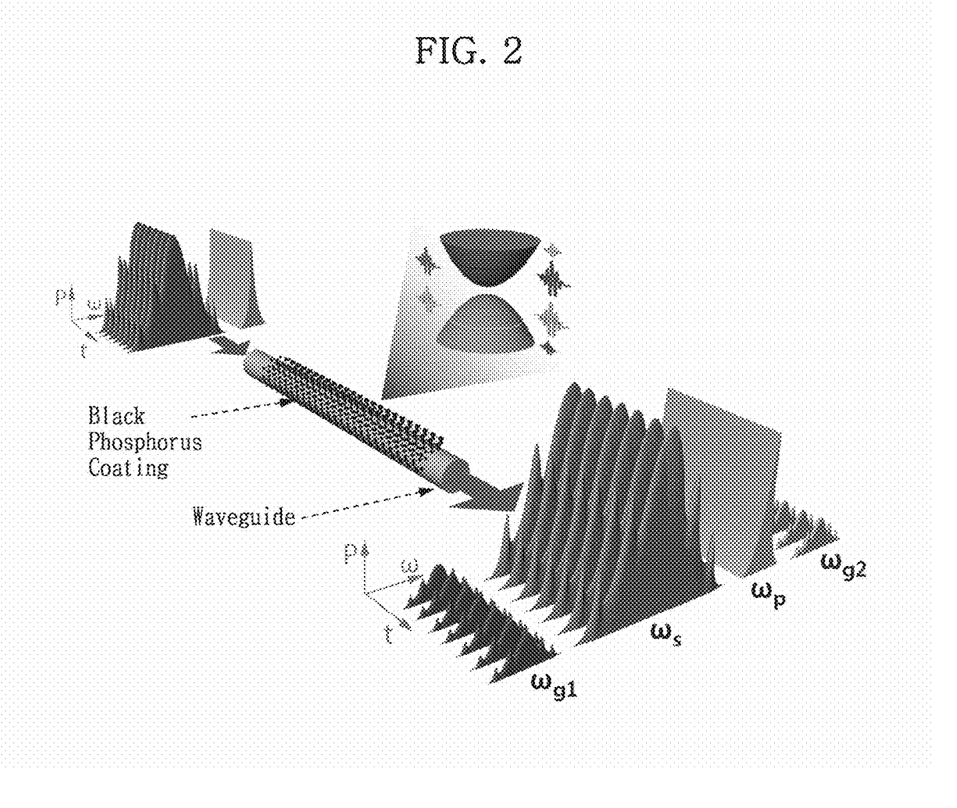
FIG. 2 is a schematic view for illustrating FWM where two waveforms are mixed.

FIG. 2 is a schematic view for illustrating FWM where two waveforms are mixed.

Referring to FIG. 2, if carrier frequencies $\omega_s$ and $\omega_p$ are propagated through a BP-deposited nonlinear element, a newly converted signal having frequencies $\omega_{g1}$ and $\omega_{g2}$ is generated. In the FWM generation theory, the electric field E may be expressed as in Equation 1 below.

$$E_{\omega_k}(r,t) = \frac{1}{2}\sum_{k=p,s,i} E_{\omega_k}(r,t)e^{i\omega_k t} + c.c. \quad \text{Equation 1}$$

The nonlinear response by the electric field is as in Equation 2 below.

$$N(\omega)=\epsilon_0 \epsilon E(\omega)+\epsilon_o \chi^{(3)} \quad \text{Equation 2}$$

Here, $\epsilon$ represents relative permittivity. Due to energy conversation, the frequency of a newly generated signal may be expressed as in Equation 3 below.

$$\omega_{g1}=2\omega_s-\omega_p$$

$$\omega_{g2}=2\omega_p-\omega_s \quad \text{Equation 3}$$

Figure 3:
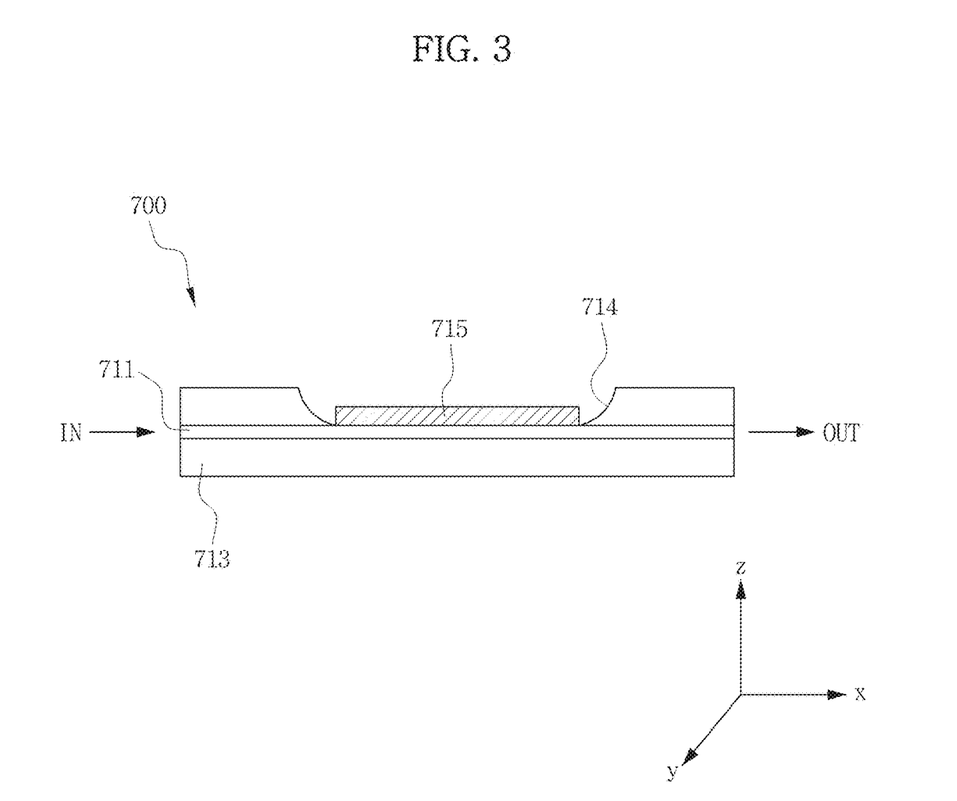
FIG. 3 is a sectional view showing an optical element based on black phosphorus as depicted in FIG. 1.

FIG. 3 is a sectional view showing an optical element based on black phosphorus as depicted in FIG. 1.

Referring to FIG. 3, the optical element 700 based on black phosphorus according to the present disclosure includes an optical fiber having a core 711 and a cladding 713, and a black phosphorus layer 715.

The black phosphorus has significantly high charge mobility (hole mobility, about 300 to 1,000 $cm^2/V \cdot s$) and also exhibits an excellent on/off ratio ($10^4$ to $10^5$), which has been a greatest drawback of graphene whose bandgap varies according to thickness, and thus the black phosphorus is being recently spotlighted as a new next-generation semiconductor material.

In other words, the black phosphorus is an excellent optical material nearly competitive to graphene and also has characteristics as a semiconductor, and thus the black phosphorus exhibits applicability superior to graphene. However, the black phosphorus has been initially studied as a semiconductor having a bandgap, and thus its optical characteristics have not been studied actively. Thus, the study on application of black phosphorus as an actual optical element is not sufficient. In addition, since the black phosphorus is weak against degradation such as oxidation in comparison to graphene and thus may be easily exposed to optical damages, which is a serious obstacle in the above study.

The present disclosure uses an indirect operating method using an evanescent field to solve the above problems, and also implements an ultrafast optical switching device by means of nonlinear optical absorption of the black phosphorus.

The core 711 is formed at a center of the optical fiber in a length direction (an x-axial direction along which the laser is transmitted) to allow the laser to pass therethrough. The core 711 is made of a material with a higher diffractive index in comparison to the cladding 713.

The cladding 713 surrounds the core 711, and its side is ground to be partially removed. Accordingly, a groove 714 is formed at the cladding 713, and the core 711 is partially exposed in the length direction of the optical fiber (the x-axial direction).

The black phosphorus layer 715 is located on the core 711 in a region where the cladding 713 is removed, and interacts with the laser to guide saturable absorption of the laser in the core 711. The black phosphorus layer 715 may be formed with a single layer or in multi layers.

The laser is transmitted through the core 711 extending in the x-axial direction. Since the core 711 is not disconnected due to the black phosphorus layer 715, the laser is continuously transmitted without being interrupted by the black phosphorus layer 715. The laser transmitted along the core 711 is guided by a difference in diffractive index between the core 711 and the cladding 713.

A part of the guided laser reacts with the black phosphorus layer 715 to form laser pulses. In other words, an average diffractive index of the cladding 713 is lowered and a mode field is spread widely. For example, the cladding 713 filled with silica having a diffractive index of about 1.5 is filled with the air having a diffractive index of about 1 by means of the groove 714, and thus an average diffractive index of this portion is lowered. As a result, the mode field is broadened.

Here, the mode field widely spreading at the portion ground by the groove 714 interacts with the black phosphorus layer 715 to form laser pulses. A tail portion of the spreading mode field is called an evanescent field.

By means of the evanescent field interaction where just a part of laser interacts with the black phosphorus layer 715, the black phosphorus layer 715 is thermally not damaged. A raw material burning at an optical intensity of about 15 dBm is not burned at a greater optical intensity at the core 711 but stably operates. In other words, the black phosphorus layer 715 weak against heat is not easily damaged, and thus the black phosphorus layer 715 may be used semi-permanently.

As a result, the black phosphorus layer 715 weak against heat may be stabilized even at high-output laser interaction by means of the evanescent field interaction. The laser pulses formed and guided by the black phosphorus layer 715 are transmitted in an x-axial direction along the core 711.

Black phosphorus is a saturable absorption material, which absorbs light of weak intensity and allows light of strong intensity to pass. In addition, since the black phosphorus has high nonlinearity, it is possible to minimize a pulse size and thus generate high-quality pulses.

In addition, the black phosphorus has a predetermined bandgap and absorbs only energy over the bandgap. Due to the bandgap, the black phosphorus has a semiconductor property, and the bandgap may vary within a range of 0.3 to 2.0 eV depending on the number of layers of the black phosphorus layer 715, namely a thickness thereof.

Black phosphorus is one of allotropes of phosphorus and has a layered structure which may have a thickness in an atom level, similar to graphene. Black phosphorus is capable of overcoming both metallic properties of graphene and low charge mobility of chalcogenide, which hinder the characteristics of a semiconductor element.

Black phosphorus is excellent in both charge mobility and an on/off ratio, and also has high transmittance, similar to graphene, and also a broad transmission spectrum (encompassing a 1550 nm band) in a bulk state.

Meanwhile, black phosphorus has a limit in practical use since it is weak against the environment in comparison to graphene and also laser irradiated thereto accelerates oxidization of energy and thus causes rapid degradation. If black phosphorus is used as a saturable absorber, the black phosphorus is generally applied directly, in which black phosphorus pieces are inserted between cores of an optical fiber. However, in this process, black phosphorus may be exposed to high energy and thus damaged, and also may be degraded due to oxygen or moisture penetrating into the optical fiber.

In order to solve the above problems, in the present disclosure, an indirect operating method using an evanescent field is used. In detail, one side of the cladding 713 is partially removed into a D-shaped form by means of side grinding, so that the evanescent field present at a border of the cladding 713 and the core 711 through which an optical signal passes is exposed.

If black phosphorus pieces are attached onto the optical fiber having a ground side, it is possible to guide attenuation of the optical signal in the core 711 by absorbing the evanescent field of the pieces.

Meanwhile, black phosphorus is not stable in the air since it has too high response speed. Thus, the optical element 700 may further include a protective layer (not shown) formed on the black phosphorus layer 715 in order to isolate the black phosphorus layer 715 from exterior elements. The protective layer protects black phosphorus, which may be easily oxidized, against the air or moisture which may cause oxidization.

The protective layer may be made of a polymer compound. The polymer compound may be formed by curing a single material or by curing a mixture of single materials. The protective layer may be made of, for example, polydimethylsiloxane (PDMS). In another embodiment, the protective layer may be made of aluminum oxide ($Al_2O_3$).

Accordingly, in the optical element according to the present disclosure, a moving path of the optical signal is isolated from the composed film, and thus it is possible to avoid resultant scattering. In addition, since the optical element operates by means of interaction with a part of the optical signal by using the evanescent field, damage on the material is reduced. Also, since the protective layer is applied to black phosphorus which may be easily oxidized in the art, it is possible to isolate black phosphorus from the air.

Figure 4A:
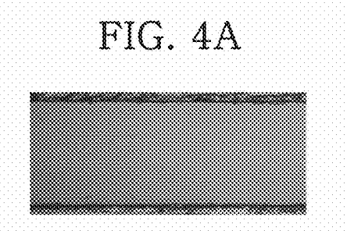
FIGS. 4A to 4C are diagrams showing an example of manufacturing an optical element based on black phosphorus as depicted in FIG. 3.
Figure 4B:
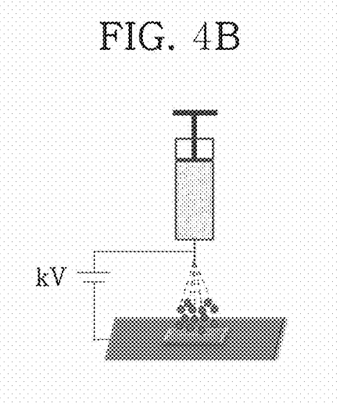
Figure 4C:
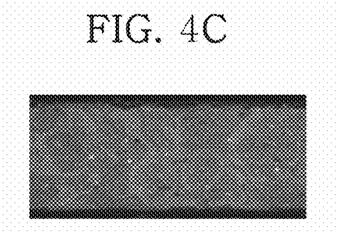

FIGS. 4A to 4C show an example of manufacturing the optical element 700. Here, FIG. 4A is an optical microscopic photograph showing an optical fiber ground into a D-shaped form. As shown in FIG. 4B, a black phosphorus dispersion solution is sprayed to a side of the ground optical fiber by means of an electronic sprayer. FIG. 4C is an optical microscopic photograph after black phosphorus is deposited.

Hereinafter, in order to verify the effects of the present disclosure, an experiment performed using optical switching device 1 configured according to the embodiment of FIG. 1 is explained. Detailed experiment environments are as follows.

In order to verify FWM-based wavelength conversion, an optical fiber device on which black phosphorus (BP) is deposited is used. In this experiment, a continuous wave (CW) laser from a first laser (ECL1) with a fixed wavelength is adopted as a signal laser. Another continuous wave laser from an external laser (ECL2) having a variable wavelength range of 1525 to 1575 nm is used as a pump laser. The continuous wave signal output from the external laser (ECL2) is firstly modulated with a carrier frequency (130 MHz to 20 GHz) amplified by an erbium-doped optical fiber amplifier (EDFA).

The amplified signal then passes through a band-pass filter in order to suppress the amplified spontaneous emission (ASE) from the EDFA. The pump signal from the ECL1 is amplified by passing through another band-pass filter. Two different polarization controllers (PC) are employed to optimize the state of polarization (SOP) of both the pump and the signal. The pump and the modulated signal are combined by a 3 dB directional coupler (DC), after which the combined laser takes part in FWM generation while propagating through the BP-deposited D-shaped optical fiber device. After that, the output light spectrum is measured by an optical spectrum analyzer 11.

In the FWM, the pump laser and the continuous wave laser signal are simultaneously propagated to the nonlinear optical element 700 using black phosphorus. In the embodiment of FIG. 1, the second laser pump wavelength is adjusted to 1552.6 nm, and the first laser is fixed to 1559 nm.

During the experiment, the actual input powers to the BP-deposited D-shaped fiber are estimated to be 22.5 dBm and 18.5 dBm for the pump source and the signal source, respectively. On the other hand, the power of the combined laser through the directional coupler 500 is measured at 20.5 dBm.

Figure 5A:
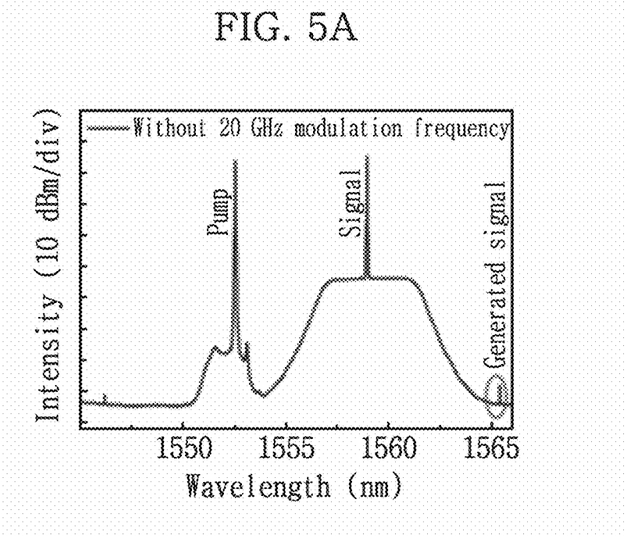
FIG. 5A shows a spectrum result obtained when BP is not deposited to the optical element.
Figure 5B:
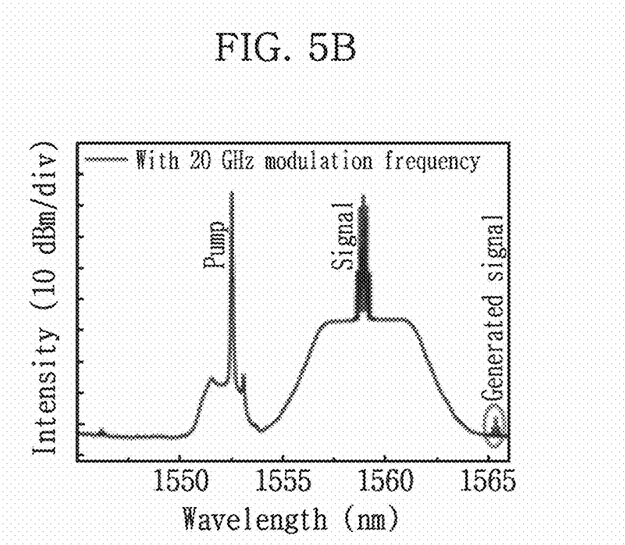
FIG. 5B shows a spectrum result obtained when BP is deposited to the optical element according to the present disclosure.

FIG. 5A shows a spectrum result obtained when BP is not deposited to the optical element, and FIG. 5B shows a spectrum result obtained when BP is deposited to the optical element according to the present disclosure.

First, referring to FIG. 5A, FWM spectra obtained from a D-shaped optical fiber not using BP are measured at different modulation frequencies, and a newly generated signal is found at 1565.4 nm.

Referring to FIG. 5B, when BP is deposited, the same spectrum result as in FIG. 5A is obtained. At this time, new FWM signals are generated at the same location as in FIG. 5A, but the power of the new signal is observed higher than FIG. 5A by 1.6 dB or more.

Therefore, under the same experimental conditions, the FWM signal using BP is stronger by 33% or more in view of the laser power. Accordingly, BP enhances FWM generation by contributing to the total nonlinear effect of the device. Nevertheless, when BP is deposited, the nonlinearity is improved in comparison to silica, and even though a distance of BP (in m scale) is short, the power of FWM peak may be reinforced since the nonlinearity increases.

If the signal pulse passes through the BP-deposited fiber, as the modulation frequency is higher, the sideband in the optical spectrum is gradually separated from the main peak. By using this, wavelengths may be separated, and the optical element may be controlled to have a desired wavelength.

Figure 6A:
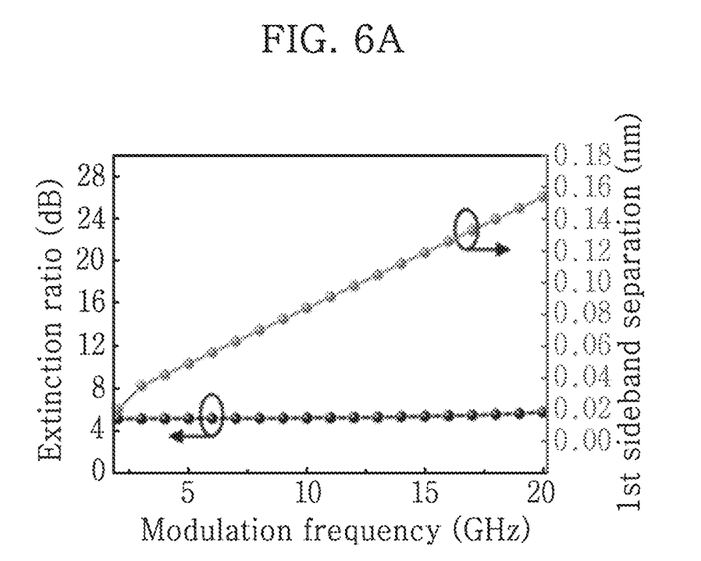
FIGS. 6A and 6B are graphs prepared by tracing sideband linear separation caused by the increase of a modulation frequency in FIGS. 5A and 5B.
Figure 6B:
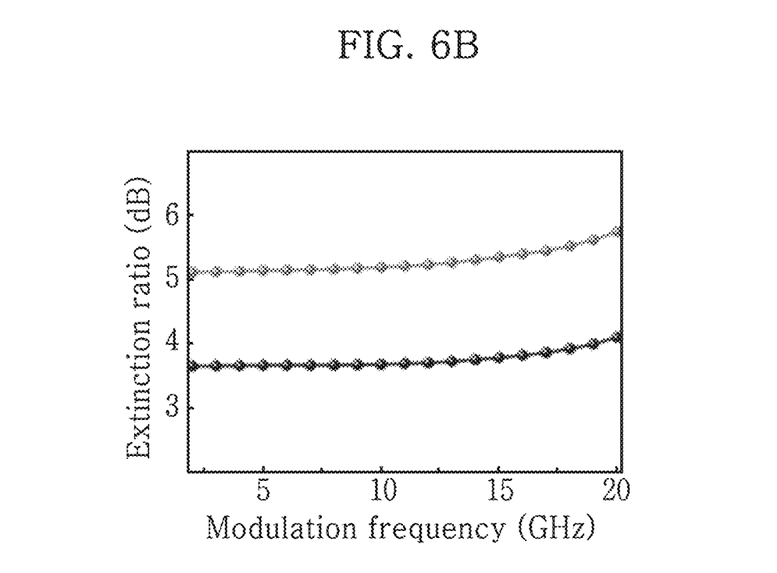

FIG. 6A is a graph prepared by tracing an augmenting distance corresponding to the increased modulation frequency, which is a representation of linear separation of sidebands from the main peaks of the newly generated signal in FIG. 5A, and FIG. 6B is a graph prepared by tracing under the same conditions as in FIG. 6A, when BP is deposited to the optical element according to the present disclosure.

Referring to FIG. 6A, an extinction ratio of the newly generated signal has linearity, but referring to FIG. 6B according to the present disclosure, it may be found the extinction ratio of the newly generated signal has nonlinearity.

Figure 7A:
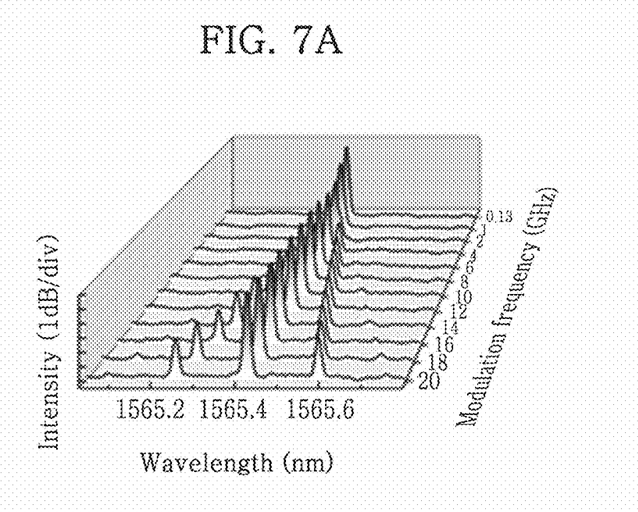
FIGS. 7A and 7B are diagrams showing newly generated FWM signals and results of a detuning experiment where the FWM signals shift corresponding to shifting of the pump signal.

FIG. 7A shows newly generated FWM signals.

During the FWM process, the information carried by the original signal is copied to the converted signals at different wavelengths. As a part of the experiment, the trend of signal copying is demonstrated in the generated signals at various modulation frequencies varying from 130 MHz to 20 GHz. At the low modulation frequency of 130 MHz, the signal remains narrow, and thus there is no converted signal. On the other hand, the converted signal at the modulation frequency of 20 GHz shows the sidebands at relatively the same positions as the modulated signal. This phenomenon confirms the copying trend of the original modulated signal by the newly generated signal.

In addition, with the same experimental setup, the conversion efficiency defined as the power ratio between the generated signal and the original signal, which is estimated as −71.1 dB, is measured. Finally, the nonlinear element of BP-deposited fiber device is re-affirmed in terms of the FWM-based wavelength conversion with three different samples. The similar nonlinear response is observed in all three samples, hence the strong reproducibility of the experiment.

Both the pump and the signal laser are adjusted to fit into one filter with a 4 nm wide bandwidth to demonstrate the detuning process of FWM (supporting information). For example, the continuous signal is kept fixed at 1552.53 nm, and the pump wavelength is changed by 0.1 nm each time. Whenever the pump wavelength is shifted by 0.1 nm from the original wavelength, the generated signals also shifts by 0.1 nm accordingly, and FWM is generated.

Figure 7B:
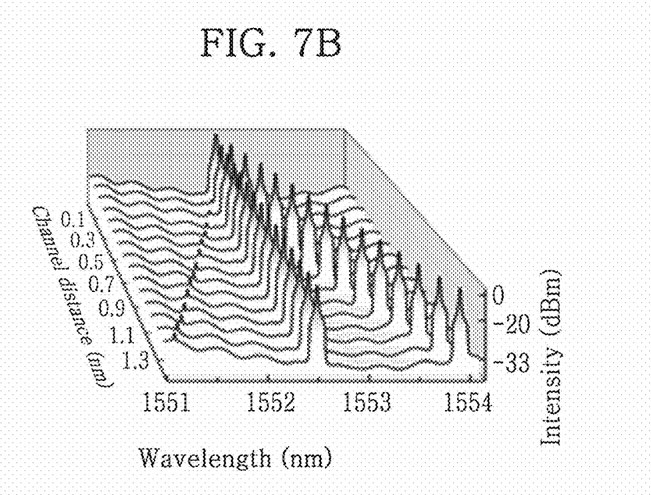

FIG. 7B represents the detuning experiment where the FWM signal shifts corresponding to shifting of the pump signal. The detuning study also verifies that the employment of pump signal at either shorter or longer wavelength would result in FWM-based wavelength conversion, and thus the bandwidth can be selected therefrom.

In conclusion, efficient optical switching is demonstrated by FWM-based wavelength conversion using an optical fiber device on which black phosphorus is deposited. As a result of the experiment, it is demonstration that the black phosphorus-based optical element has nonlinearity so sufficiently to perform efficient optical switching for signals with ultrafast modulation frequencies of up to 20 GHz.

By using the optical nonlinearity in addition to the electrical advantages of BP such as adjustable bandgap and high on/off ratio, the present disclosure may be usefully applied to opto-electronic applications or the like.

Figure 8:
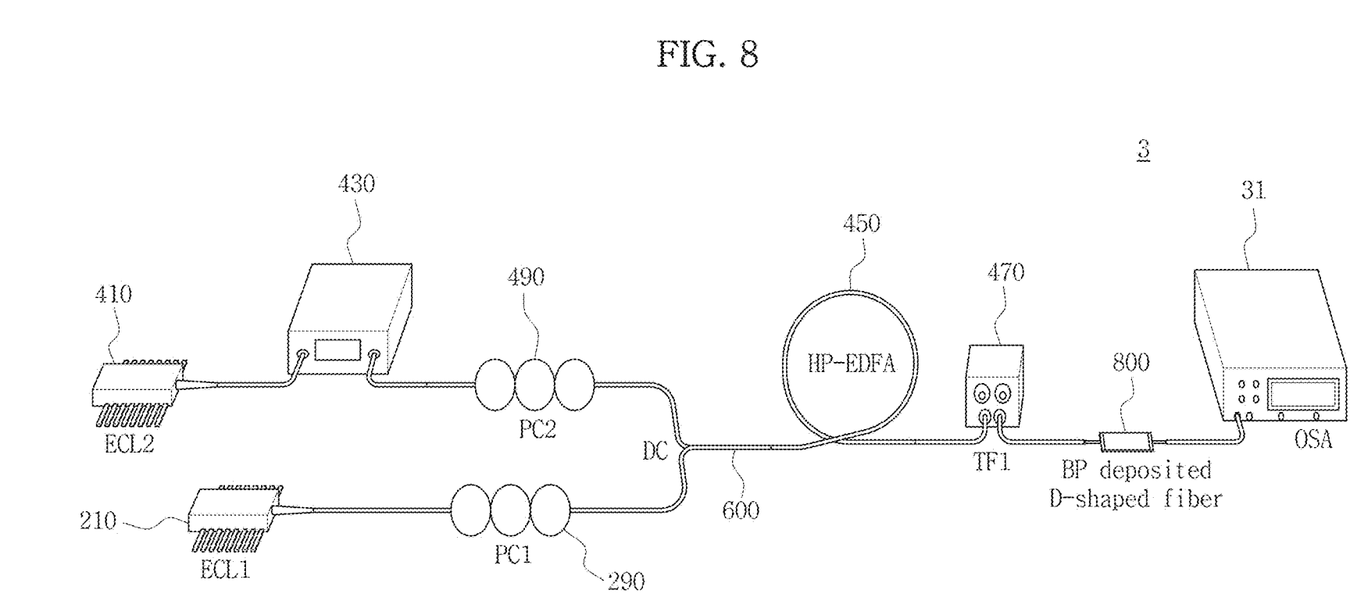
FIG. 8 is a diagram showing an ultrafast optical switching device based on black phosphorus according to another embodiment of the present disclosure.

FIG. 8 is a diagram showing an ultrafast optical switching device based on black phosphorus according to another embodiment of the present disclosure.

Referring to FIG. 8, an optical switching device 3 of this embodiment includes a first channel 210, a second channel 410, a modulator 430, a directional coupler 600, a wavelength tunable filter 470 and an optical element 800 using black phosphorus.

The components of the optical switching device 3 are connected by means of optical fibers. The structure of the optical switching device 3 as depicted in FIG. 8 is just an example, and components may also be excluded, added or changed as necessary. In this embodiment, the same component as in the optical switching device 1 of FIG. 1 will be not described again.

The first channel 210 and the second channel 410 generate continuous wave lasers of different wavelengths. In other words, the first channel 210 outputs a first laser which is a continuous wave of a first wavelength, and the second channel 410 outputs a second laser which is a continuous wave of a second wavelength different from the first wavelength.

The modulator 430 modulates the second laser output from the second channel 410. In an embodiment, the modulator 430 periodically turns on/off the second laser which is a continuous wave, to be modulated into a pump signal.

The optical switching device 3 may further include a first polarization controller 290 and a second polarization controller 490 for adjusting polarizations of the first laser and the second laser, respectively.

The directional coupler 600 couples and outputs the first laser and the second laser.

The optical switching device 3 may further include an amplifier 450 for amplifying a wavelength of the coupled first and second lasers.

The wavelength tunable filter 470 is a frequency filter for changing a wavelength of the coupled first and second lasers. A signal wavelength may be tuned using the wavelength tunable filter 470.

The optical element 800 controls the coupled first and second lasers output from the wavelength tunable filter 470 by means of nonlinearity and an evanescent field of black phosphorus.

The optical element 800 may have substantially the same configuration as the optical element 700 depicted in FIGS. 1 and 3. Therefore, the same component as in the optical element 700 of FIGS. 1 and 3 is designated by the same reference sign and is not described again.

Figure 9A:
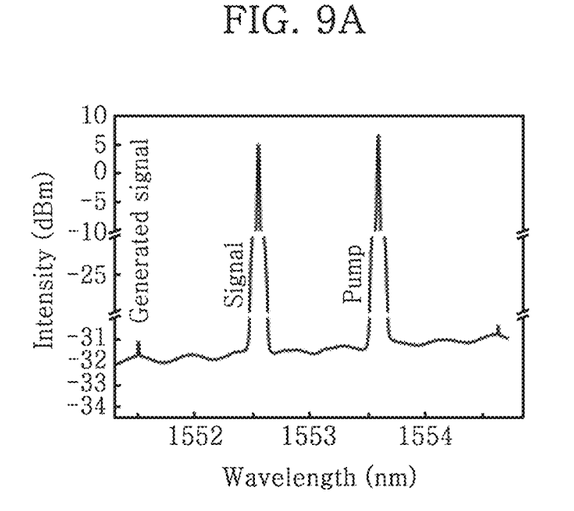
FIGS. 9A and 9B show signals generated by the optical switching device of FIG. 8 at 130 MHz and 20 GHz, respectively.
Figure 9B:
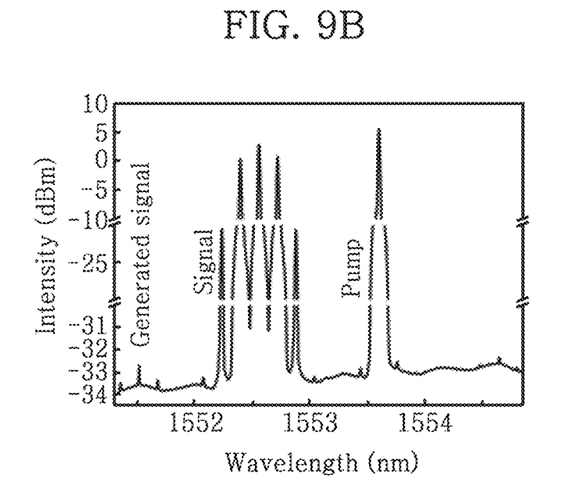

FIGS. 9A and 9B show signals generated by the optical switching device of FIG. 8 at 130 MHz and 20 GHz, respectively.

Referring to FIGS. 9A and 9B, it may be found that, if the signal pulse passes through the BP-deposited fiber, as the modulation frequency is higher, the sideband in the optical spectrum is gradually separated from the main peak.

Even though the embodiments have been illustrated and explained heretofore, it should be understood that the present disclosure can be changed or modified in various ways without departing from the scope of the appended claims by those having ordinary skill in the art.

Black phosphorus having a bandgap (direct bandgap) varying according to an adjustable thickness is suitable for absorbing or emitting an optical signal and is spotlighted as one of next-generation semiconductor materials useful for photonics and optoelectronics. The present disclosure provides an optical switching device based on black phosphorus.

What is claimed is:

1. An ultrafast optical switching device based on black phosphorus, comprising:
 a first channel configured to generate a first laser which is a continuous wave of a first wavelength;
 a second channel configured to generate a second laser which is a continuous wave of a second wavelength different from the first wavelength;

a modulator configured to modulate the second laser generated by the second channel into a pump signal;

a first wavelength tunable filter and a second wavelength tunable filter configured to change wavelengths of the first laser and the second laser, respectively;

a directional coupler configured to couple the first laser and the second laser; and an optical element configured to control the first and second lasers coupled by the directional coupler by means of nonlinearity and an evanescent field of black phosphorus.

2. The ultrafast optical switching device based on black phosphorus according to claim 1, further comprising:

a first amplifier and a second amplifier configured to amplify wavelengths of the first laser and the second laser, respectively.

3. The ultrafast optical switching device based on black phosphorus according to claim 1, further comprising:

a first polarization controller (PC) and a second polarization controller configured to adjust polarizations of the first laser and the second laser, respectively.

4. The ultrafast optical switching device based on black phosphorus according to claim 1, wherein the optical element includes:

a core formed at a center of an optical fiber in a length direction thereof and allowing a laser to pass therethrough;

a cladding configured to surround the core, the cladding being partially removed so that the core is exposed in the length direction; and a black phosphorus layer located on the core where the cladding is removed, the black phosphorus layer interacting with the laser to guide saturable absorption of the laser in the core.

5. The ultrafast optical switching device based on black phosphorus according to claim 4, further comprising:

a protective layer formed on the black phosphorus layer to prevent oxidation of the black phosphorus layer.

6. The ultrafast optical switching device based on black phosphorus according to claim 4, wherein the black phosphorus layer is formed with a single layer or multi layers.

7. An ultrafast optical switching device based on black phosphorus, comprising:

a first channel configured to generate a first laser which is a continuous wave of a first wavelength;

a second channel configured to generate a second laser which is a continuous wave of a second wavelength different from the first wavelength;

a modulator configured to modulate the second laser generated by the second channel into a pump signal;

a directional coupler configured to couple the first laser and the second laser;

a wavelength tunable filter configured to change a wavelength of the first and second lasers coupled to each other, respectively; and an optical element configured to control the first and second lasers coupled by the directional coupler by means of nonlinearity and an evanescent field of black phosphorus.

8. The ultrafast optical switching device based on black phosphorus according to claim 7, further comprising:

an amplifier configured to amplify a wavelength of the first laser and the second laser coupled to each other, respectively.

9. The ultrafast optical switching device based on black phosphorus according to claim 7, further comprising:

a first polarization controller (PC) and a second polarization controller configured to adjust polarizations of the first laser and the second laser, respectively.

10. The ultrafast optical switching device based on black phosphorus according to claim 7, wherein the optical element includes:

a core formed at a center of an optical fiber in a length direction thereof and allowing a laser to pass therethrough;

a cladding configured to surround the core, the cladding being partially removed so that the core is exposed in the length direction; and a black phosphorus layer located on the core where the cladding is removed, the black phosphorus layer interacting with the laser to guide saturable absorption of the laser in the core.

11. The ultrafast optical switching device based on black phosphorus according to claim 10, further comprising:

a protective layer formed on the black phosphorus layer to prevent oxidation of the black phosphorus layer.

12. The ultrafast optical switching device based on black phosphorus according to claim 10, wherein the black phosphorus layer is formed with a single layer or multi layers.

* * * * *